United States Patent [19]
Drbal

[11] Patent Number: 4,804,197
[45] Date of Patent: Feb. 14, 1989

[54] CLAMP DEVICE WITH RADIALLY SPLIT HEAD

[76] Inventor: Vladimir Drbal, 400 Davey Glen Rd. #4810, Belmont, Calif. 94002

[21] Appl. No.: 116,021

[22] Filed: Nov. 3, 1987

[51] Int. Cl.[4] ............ B23B 31/20

[52] U.S. Cl. ............ 279/41 R; 174/65 G; 248/27.3; 279/42; 285/322; 403/290

[58] Field of Search ............ 279/41 R, 42, 46 R; 285/322, 243, 245; 248/27.3; 403/289, 290; 174/65 R, 65 G

[56] References Cited

U.S. PATENT DOCUMENTS 2,452,184 10/1948 Cole ............ 279/46 R
3,123,662 3/1964 Fink ............ 174/65 G
4,302,035 11/1981 Ochwat ............ 174/165 R X

*Primary Examiner*—Joseph H. McGlynn
*Assistant Examiner*—Steven C. Bishop
*Attorney, Agent, or Firm*—Dressler, Goldsmith, Shore, Sutker & Milnamow, Ltd.

[57] ABSTRACT

A clamping device for supporting a workpiece in a clamped condition. The device includes a split head fastener composed of a head having exterior and interior surfaces, and a threaded shaft attached to the head and extending substantially normally from the interior surface. The head is segmented by slots extending from the exterior surface toward the interior surface, and further defines a passageway extending inwardly along the axis from the exterior surface. To clamp a workpiece in the device, a tightening member carried on the shaft is rotated to bring it into contact with the interior surface of the head, in an outer surface region thereof only. This contact forces the segments surrounding the passageway to pivot toward the axis of the passageway, causing clamping of a workpiece received in the passageway.

4 Claims, 3 Drawing Sheets

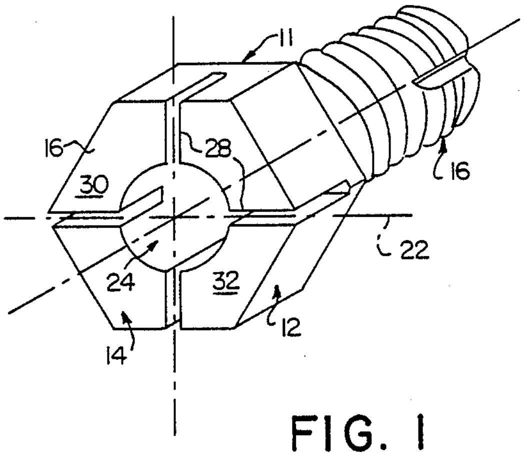
FIG. 1
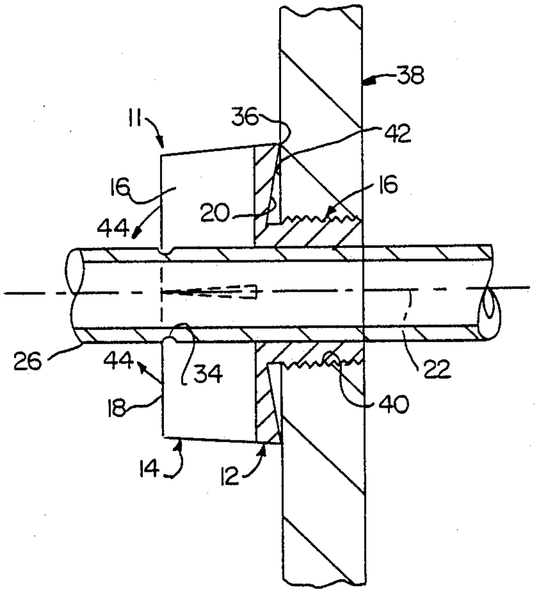
FIG. 2
FIG. 3
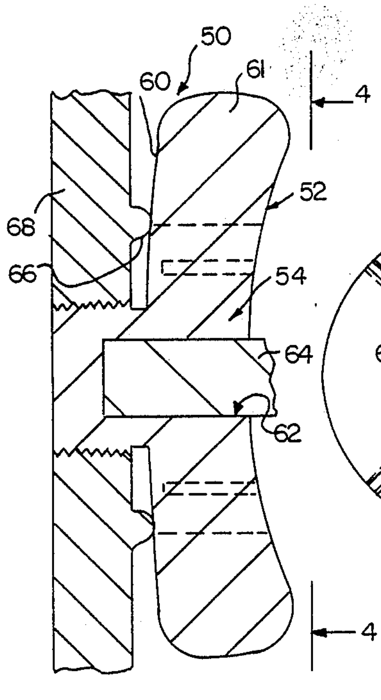
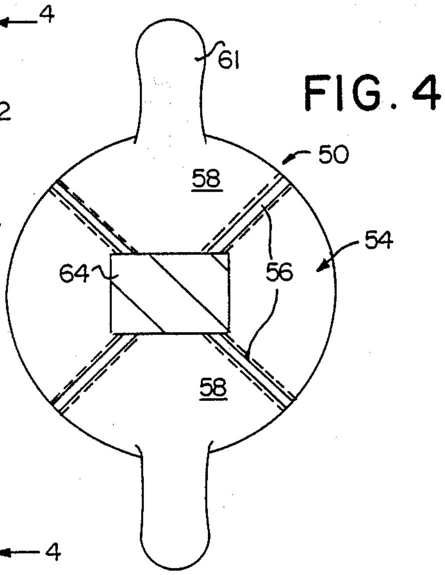
FIG. 4

CLAMP DEVICE WITH RADIALLY SPLIT HEAD

FIELD OF THE INVENTION

The present invention relates to split-head clamp devices for use in mounting, clamping or connecting workpieces.

BACKGROUND OF THE INVENTION

Split head clamping fasteners have long been known, especially in the electrical connector art. Examples of such fasteners are found in U.S. Pat. Nos. 368,149; 1,809,381; 2,406,346; and 2,440,828 for holding an electrical wire which passes through that portion of the fastener which is a collet having a radially split head. The head has an increasing outer diameter, resembling a cone, which is to mate with a ferrule having a funnel shaped interior. The body of the collet is threaded and, after passing through the ferrule, is secured by a collet nut, which draws the conic head further into the ferrule and thereupon forces the segments of the split head radially inward against the work piece, an electrical cable. The ferrule itself is fastened to a main body, such as an electrical panel or battery.

Although this prior art type of fastener is useful, it is limited by the fact that it requires several mating parts as well as mechanical access to both ends of the ferrule; one end for inserting the collet and the other end for threading the collet nut. The fact that the fastener itself must be secured to a primary support further limits its versatility. Also, the mechanical force necessary to draw the collet into the ferrule requires a threaded pair of parts and a hand tool for tightening the collet nut.

Swedish patent No. 87,205 discloses a clamping device in which tightening a nut on a threaded, slotted shaft reduces the interior shaft diameter, causing a clamping action of a tubular workpiece held in the shaft. U.S. Pat. No. 1,615,233 shows a similar type of clamp, in which tightening a nut on a conical, segmented head draws the segments together to produce a clamping action. U.S. Pat. No. 2,383,692 and French patent No. 2,442,392 show similar types of split shaft clamps in which tightening a nut on a conical, segmented shaft produces clamping action on a workpiece held in the shaft.

More recently, U.S. Pat. Nos. 4,530,523 and 4,544,186 teach a clamping device in which clamping is produced by a pivoting action of threaded shaft segments. Here a nut carried on the shaft forcibly abuts a clamp surface, as the nut is tightened, and the reaction force is transmitted through the action of the bevelled nut threads to the bevelled shaft threads, to cause a slight pivoting in the clamp segments, to produce clamping of a workpiece held in the shaft.

It will be appreciated that all of the later-mentioned prior art clamp devices have a slotted shaft designed to produce a clamping action as a nut is advanced along the threaded shaft. One limitation of this construction is that clamping action requires interaction with a threaded nut, and thus precludes for example, the possibility of a simple screw-like shaft which can be engaged with a wall surface or the like, for clamping a workpiece to a wall surface. Secondly, each clamp member must be fully duplicated in a two-sided clamp, i.e., a clamp designed to clamp two workpieces together. Such devices are also limited to threaded engagement between a shaft and nut, and thus require turning in order to achieve clamping action.

SUMMARY OF THE INVENTION

It is one object of the present invention to provide an improved clamping device which overcomes problems and limitations associated with prior art clamps.

A more particular object of the invention is to provide a clamp device in which clamping action is produced by clamping action of a segmented clamp head, rather than by closure of slotted shaft segments.

One advantage provided by this construction is that the clamping action can be achieved by advancing a screw-like shaft into a wall surface or the like, for clamping a workpiece to the wall surface.

Another advantage provided by the construction is that a two-sided clamp may be formed in which clamping action is achieved by interaction of clamping members on each side of the clamping device.

Still another advantage of this construction is that clamping can be achieved with threaded engagement between a shaft and tightening nut.

Providing a clamping device in which the clamping force is directed against a relatively narrow annular region of the workpiece is yet another object of the invention.

The clamping device of the invention includes a split-head fastener composed of a head having exterior and interior surfaces, and a shaft attached to the head and extending substantially normally from the interior surface thereof, along a longitudinally extending central axis. The head defines a passageway extending inwardly along this axis from the exterior surface, and dimensioned for receiving a portion of such workpiece. The head further defines slots extending from the exterior surface generally axially toward but not to said interior surface, these slots forming segments in the head which function as clamping members.

A threaded member carried on the shaft for axial movement thereon has a contact face designed to contact the inner surface of the head in an outer surface region thereof which is radially spaced from the region of attachment of the shaft to the head. Advancing the member along the shaft forces the contact surface against this outer surface region, forcing the segments in the head to pivot inwardly. This reduces the cross section of the passageway adjacent the exterior surface of the head, causing clamping of a workpiece received in the passageway.

In one general embodiment, the interior surface of the head includes a camming surface which typically is formed by an undercut in the interior surface, or by one or more projections from a planar interior surface. The contact surface of the tightening member can be substantially planar.

In a second general embodiment, the contact face of the tightening member includes a camming surface which extends from the contact face. This surface may also be formed as an undercut in the contact face or by one or more projections from a planar contact face. The interior surface of the contact face may be substantially planar.

In an embodiment intended for attaching a workpiece to a support surface or the like, the shaft is a threaded screw which can be advanced into the support by turning, and the interior surface includes a camming surface which extends from its outer surface region axially in the direction of the shaft. When the split-head fastener is advanced toward the support, contact of the camming surface with the wall produces pivoting action on the head segments, causing clamping of a workpiece in the fastener.

In a two-sided clamp of the invention, for use in clamping a pair of workpieces axially in tandem, the tightening member of one side of the clamp functions as the tightening member of the other side of the clamp, i.e., the two heads interreact to apply opposed axial forces against one another's interior surfaces, to cause the segments in each head to pivot toward a clamping condition.

These and other objects and features of the invention will become more fully apparent when the following detailed description of the invention is read in conjunction with the accompanying drawings.

BRIEF DESCRIPTION OF THE DRAWINGS

FIG. 1 is a perspective view of a split-head fastener constructed according to one embodiment of the invention;

FIG. 2 is a side sectional view of the fastener of FIG. 1, shown operatively attached to a tightening member for clamping a tubular workpiece;

FIG. 3 is a side sectional view of a clamping device formed according to another embodiment of the invention, and showing a rectangular workpiece supported therein;

FIG. 4 is a front-on view of the device of FIG. 3, as seen along a view line 4—4 in FIG. 3;

FIG. 10 is a side sectional view of a fastener designed for mounting a workpiece on a wall surface or the like;

DETAILED DESCRIPTION OF THE INVENTION

Figure 5:
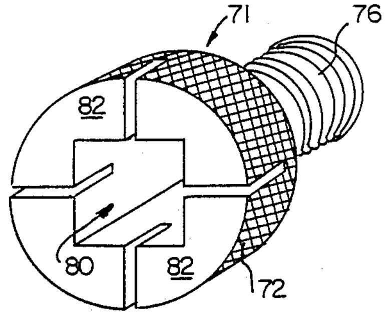
FIG. 5 is a perspective view of a split-head fastener designed for press-fit clamping.

FIGS. 1 and 2 show one preferred embodiment of a clamping device 11 constructed according to the invention. The device includes a composite split-head fastener 12 composed of a head 14 and a threaded, cylindrical shaft 16 formed to define a unitary body. The head has an exterior surface 18 and an interior surface 20 seen in FIG. 2. As seen best in FIG. 2, the shaft extends substantially normally from the interior surface of the head, along a longitudinal axis 22. A passageway 24 formed in the fastener extends along axis 22 from the exterior surface inwardly, as can be appreciated from FIG. 2, the passageway is dimensioned to receive a workpiece 26, such as a tubular workpiece therein. The workpiece may be any of a variety of tubular members, such as glass tubing, rigid metal tubing cables, ropes or rod material, such as optical fibers or the like which is to be clamped.

With reference particularly to FIG. 1, the head contains a plurality of radial slots, such as slots 28, which extend from the exterior surface of the head in a generally axial direction toward but not to the interior surface of the head. That is, the slots extend only partway through the head. As can be appreciated from the figures, the slots form two sets of opposed segments, such as opposed segments 30, 32, which define the portion of the passageway adjacent the head's exterior surface. Each segment is provided with a lip, such as lip 34 (FIG. 2) adjacent the entrance of the passageway. These segment lips collectively form a substantially annular lip used in clamping the workpiece securely, as will be seen.

According to an important feature of the invention, the interior side of the head is undercut, as seen in FIG. 2, forming an outer surface region 36 which projects axially, in the direction of the shaft, beyond the interior surface region adjacent the region of attachment of the shaft to the head. In the present case, this surface region is the substantially circumferential region at the outer edge of the interior surface. This edge projection is also referred to herein as a camming surface.

Also included in the device is a tightening member 38 which may be a threaded nut or a threaded portion of a larger support structure, such as a jig on a machine. Member 38 is internally threaded at 40 for threaded engagement of threaded shaft 16. The surface of the tightening member which confronts the interior surface of the head is referred to herein as a contact face 42. More specifically, this face is designed to contact the camming surface of the head, as the member is advanced toward the head by relative rotation of the shaft and the tightening member.

Considering now an operation for clamping workpiece 26 in the clamping device, the fastener and tightening member are initially placed in a position at which the segments in the head are freely expanded. The workpiece is then inserted into the passageway and moved to a desired axial position for clamping. The fastener is now rotated relative to the tightening member to advance the contact surface against the camming surface on the head. In the case where the tightening member is a wall support or the like, the tightening is done by rotating the fastener—e.g., by engaging the hex head. Where the tightening member is a nut or the like, the tightening may be accomplished by torqueing this nut. The latter operation has the advantage that the workpiece is not rotated during a clamping operation. In this configuration, the fastener may be formed integrally with or secured to a wall or other support, for mounting the workpiece on the support.

As can be appreciated from FIG. 2, further advancing of the fastening member causes the outer edge to pivot as if the region of contact between the camming surface and the tightening member were a fulcrum, thus bringing the interior surface of the head closer to and more parallel with the surface of the tightening member. Arrows 44 in FIG. 2 indicate the pivoting action, which causes the inner walls of the segments in the head to pivot inward and no longer lie parallel to each other. This pivoting is exaggerated in FIG. 2 for ease of viewing.

As the each of the segments pivots inwardly, toward axis 22, the lateral spacing, i.e., the width of the slots forming the segments, is reduced, as is exaggerated in FIG. 2, and the cross-sectional area of the passageway, adjacent the exterior surface of the head, is reduced. Effectively, the segments act as jaws which clamp together as the tightening member is advanced toward the head. It is also noted that the region of greatest radial movement of the segments is the region adjacent the exterior surface of the head, i.e., the region containing the segment lips, such as lip 34. The clamping action thus forces the segment lips tightly against the workpiece. The workpiece is now securely clamped to the support which serves as the tightening member.

The device is held in the clamped position, of course, by the engagement of the shaft threads with those of the tightening member. This threaded engagement is also referred to herein as means for holding the fastener in a clamping condition.

It can be appreciated that the camming surface on the fastener may be located at a selected radial position with respect to axis 22 to provide a desired balance between the tightening force required to produce clamping and the amount of pivoting needed to produce clamping. As the effective moment arm of the camming surface (its radial distance from axis 22) is increased, less force is required in tightening, but proportionately less pivoting occurs with the same axial movement of the camming surface toward the contact surface. Thus, placing the camming surface outside the radius of the head would provide a longer fulcrum arm and thus yield the desired pivoting of the clamping segments with less opposition to the advancing movement of the shaft. Conversely, if the camming surface is positioned close to the axis of the fastener, more pivoting would be achieved, but at the expense of increased work to set the fastener into the supporting wall. Also, if the camming surface is too close to the region of attachment of the shaft to the head, the clamping action would be accomplished with too little forward motion of the fastener; hence, even a slight amount of inadvertent relaxing of the pressure between the camming surface and the abutting wall face could release the clamping of the work piece.

The FIG. 1 embodiment can have a metal construction for heavy clamping or mounting uses, or can be formed of injected plastic components for lighter clamping requirements. As suggested above, either the fastener or tightening member may be formed integrally with a support element, such as a wall support or jig, for mounting a workpiece thereon. The device is suitable for clamping rods or tubes, such as glass rods, unthreaded conduit, or the like, rigidly with respect to a support surface, such as a wall surface, or where the fastener is used as a chuck for supporting a moving workpiece during machining.

FIGS. 3 and 4 show a clamping device 50 constructed according to another embodiment of the invention. As seen in the figures, the split head fastener in the device, indicated at 52, has a head 54 of generally circular periphery, with radial slots, such as slots 56, segments such as segments 58 and interior surface 60. A pair of wings, such as wing 61 formed integrally with the head can be used for manually turning the fastener, for clamping, as will be seen. A passageway 62 in the fastener is dimensioned for receipt of a workpiece, such as workpiece 64, having a rectangular cross section, as shown. The passageway terminates as a blind passage within the shaft, rather than being a through passageway as in the first described embodiment. The blind end of the passageway defines an interior seating position for the workpiece.

As in the first-described embodiment, the tightening member, indicated at 68, may be formed as part of a support element, such as a wall or jig, or may be a nut, where the fastener is secured to a support element, as above. The tightening member has an annular ring 66 which projects axially beyond the surface plane of the tightening member. This ring provides a camming surface for contacting the planar interior surface of the head, as illustrated, in an outer surface region which is radially spaced from the region of attachment of the shaft to the head. The camming surface generates the same pivoting action and clamping coaction with respect to the radial slots, segments, and passageway 62 as did the camming surface in the embodiment shown in FIGS. 1 and 2.

As above, the threaded engagement between the fastener shaft and threaded opening in the fastening member provides means for holding the fastener in a clamped condition.

The operation of the device is like that described above after initial placement of the workpiece in the passageway, the fastener and fastening member are rotated relatively, to bring the camming surface on the member into contact with the interior surface of the fastening member, as seen in FIG. 3. Further tightening of the member then produces a greater clamping force on the workpiece, as the segments are forced progressively inwardly.

The work piece could be a mounting projection of a relatively large device, such as a semi-portable music tape-playing device, which is to be removably mounted into an automobile. The ease of removal of the work piece is for its safety and is easily accomplished by its owner with less than one full reverse turn of the fastener. Hence, the fastener need not be removed from the support (tightening member) to accomplish the loosening of the jaw-like segments sufficient for removal of the work piece. For securing a device such as a tape player, more than one of the subject fasteners can be employed in spaced apart relation.

Figure 6:
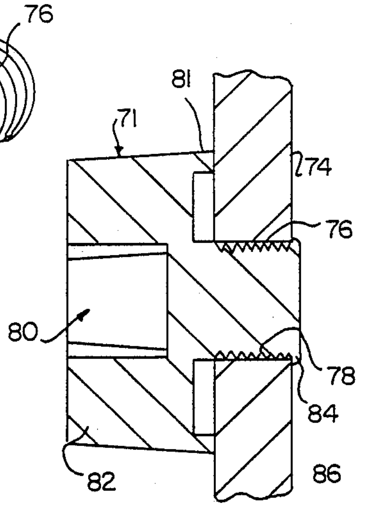
FIG. 6 is a side sectional view of the fastener of FIG. 5, shown operatively attached to a tightening member for clamping a workpiece.

Looking at FIGS. 5 and 6, there is illustrated a press fit clamp device composite embodiment 71, having a cylindrical head with a knurled periphery 72 providing a friction surface for manual grasping and pushing into an opening in a tightening member, such as the portion of a support structure 74 shown in FIG. 6. The shaft has parallel side walls as in the other embodiments and is formed with a serrated surface 76 for gripping into the sides of a smooth-walled opening 78 formed in the structure, as the fastener is pushed into this opening. The passageway, indicated at 80, can be of square cross-section, as illustrated. Although the shaft in the fastener is shown to have a cylindrical shape, the cross-section of the shaft could be square or otherwise shaped to mate with a similarly shaped opening in the support, since insertion of the fastener into the support opening can be accomplished by forward pushing without any axial rotation.

As seen from the side view in FIG. 6, the camming surface is defined by a plurality of stud-like projections such as projections 81, spaced around the periphery of the interior surface of the head. Just as with the above-described embodiments, as the fastener 71 is advanced into engagement with the confronting contact surface of the support, the camming projections 81 generate a pivoting radially inward of segments 82 formed in the head of the fastener, to reduce the cross-sectional area of the passageway, and provide clamping action. To prevent inadvertent loosening of the fastener, the leading end of the shaft has a flange 84 which is to seat against the rear surface 86 of the support. Obviously, the flange must be flexible enough to bend toward and away from the shaft serrations during insertion and subsequent intended removal of the fastener, yet be resilient enough to withstand some reasonable amount of withdrawal direction forces caused by other than intentional removal of the fastener. Molded plastic would be satisfactory material for the split-head fastener.

Figure 7:
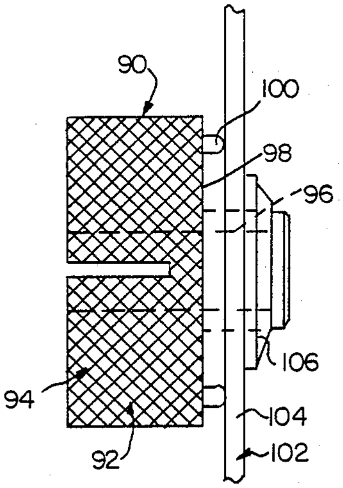
FIG. 7 is a side sectional view of a clamping device formed according to another embodiment of the invention.

In the clamping device illustrated in side view in FIG. 7, and indicated at 90, a fastener 92 has the general construction of fastener 12 described above, including a segmented head 94 and a cylindrical threaded shaft 96 extending from the interior surface 98 of the head. The interior surface has an axially extending annular camming surface 100 for engaging the surface of a tightening member.

The tightening member, shown generally at 102, has a two-piece construction, including a relatively thin plate 104 and a nut 106 which is threadedly engaged with shaft 96 and which supports the plate from behind, i.e., as it is moved against the camming surface on the fastener. It is to be noted that the figure illustrates the fastener in the non-clamping orientation—i.e., with the faces of the slot and the sides of the head parallel to the longitudinal axis of the fastener, in contrast to the corresponding non-parallel orientation shown in FIGS. 1 and 2.

In operation, the fastener is placed through the opening in the plate and nut 106 is tightened on the shaft until the fastener is supported on the plate. The workpiece is now inserted into the passageway in the fastener, as above, and the nut 106 is then tightened to force the plate against the camming surface, to produce a clamping against in the fastener.

Figure 8:
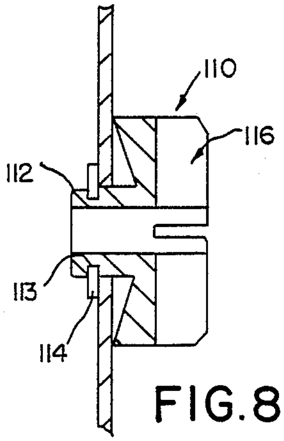
FIG. 8 is a side sectional view of another type of clamping device formed in accordance with the invention.

FIG. 8 illustrates another embodiment of a clamping device 110 useful for supporting or attaching a workpiece on a thin plate, which again forms a part of the tightening member in the device. Here the shaft in the fastening member, indicated at 112, has an annular groove 113 adapted for receiving a retaining ring 114 when the device is in a clamped condition. The plate and the ring thus form a two-piece tightening member for forcing the segments in the fastener into a clamped position when the camming surface of the fastener, indicated at 116, is pressed against the confronting contact face of the plate, as illustrated.

In operation, a workpiece is placed in the fastener, at a selected position, and the workpiece and fastener are inserted into the shaft opening formed in the plate. The fastener is then forced into a clamping condition, either by pushing the fastener from the front (exterior) side, or pulling on the rear (interior) side until the retaining ring can be slipped into groove 113, to lock the device in a clamped condition. The engagement of the retaining ring with the shaft groove thus provides the means for holding the fastener in a clamped condition.

In a related embodiment (not shown), the retaining ring is replaced by a spring-loaded ring which is forced into a position of locking engagement with the shaft groove when the fastener head is forced against the plate. This latter embodiment, like the embodiment illustrated in FIG. 6, is a self-locking clamp—i.e., clamping occurs by forcing the fastener axially into a locking position, without having to rotate the fastener or manipulate the device from the rear of the support.

Figure 9:
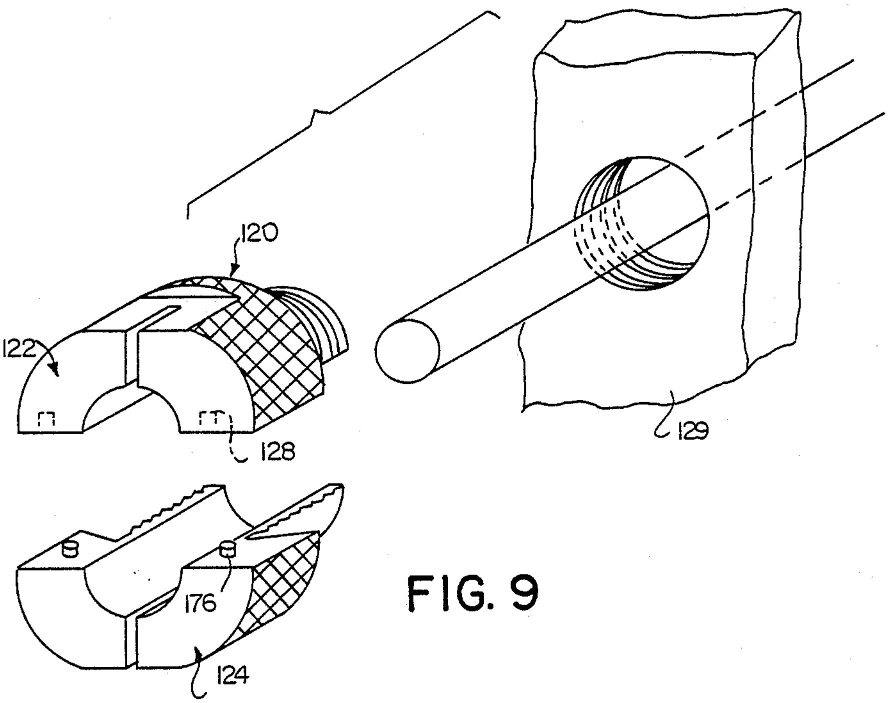
FIG. 9 is an exploded perspective view of a clamping device in which the fastener is composed of a pair of axially symmetric halves.

The fastener 120 in FIG. 9 has the characteristics of the unitary fastener's described above, such as fastener 12, but is split axially into two axially symmetrical halves 122 and 124 for ease of installation under certain conditions. Any suitable keying or detent means, such as pin 126 and socket 128, can be employed for maintaining alignment of the portions as they are being threaded into the tightening member, a portion of which is shown at 129. Since the alignment and initial threading can be accomplished by hand, but the final tightening might require a tool, the periphery of the head is provided with both flat and knurled surfaces.

Figure 10:
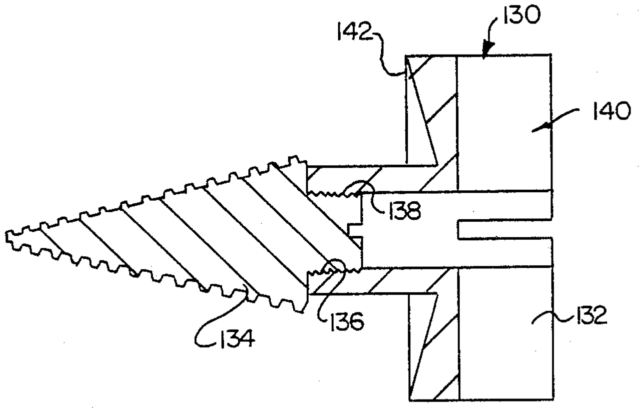

Shown in FIG. 10 is yet another fastener 130 in which the head 132 and shaft 134 are separable, as by threads 136 and 138. By being separable, any of the prior embodied head configurations could be mated with any of the shafts. With only a relatively few head parts and shaft parts for inventory, there can result numerous different fasteners for a variety of different purposes. A special advantage of a separable shaft is that it can be made of a different material than the head.

For example, the shaft 134 is shown as a wood screw and would be of metal, but the head 132 could be of plastic and thereby easier to mount manually. Moreover, the separate shaft can be wall-mounted with use of greater force and torque, if need be, without fear of damaging radially split segment such as segment 140. In the operation of the device shown in FIG. 10, the fastener is preferably screwed into, but not tightened against, a support surface, which provides the tightening member contact surface in the device. After placing the workpiece in the fastener, the workpiece and fastener are turned to tighten the camming surface of the fastener, indicated at 142, against the support contact surface, until the pivoting of the segments in the fastener against the workpiece produces the desired clamping action.

Figure 11:
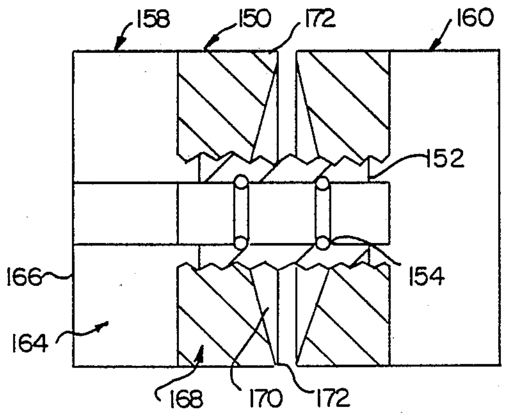
FIG. 11 shows a two-sided clamp constructed according to an embodiment of the invention in which the head of one side of the clamp functions as a fastening member at the other side of the clamp.

FIG. 11 shows a two-sided clamping device 150 constructed according to the invention, for use in clamping a pair of workpieces, such as two tubes, together—typically in abutting, end-to-end relationship. The device includes a hollow threaded shaft 152 which is dimensioned to receive the two workpieces therein, and may be provided with O-rings, such as O-ring 154, for sealing the two workpieces within the shaft.

Each end of the shaft threadedly engages a fastener head, such as head 158 at the left side of the shaft, and head 160 at the right side. Head 158, which is representative, has a segmented exterior portion 164 terminating at an exterior surface 166, and a threaded interior portion 168 terminating at an undercut interior surface 170, defining a camming surface 172 at the outer edge of the interior surface. The head is designed, as above, such that force applied to the camming surface causes pivoting of the segments in the exterior portion of the head, to lock a workpiece in the passageway formed axially in the head.

In operation, the two workpieces to be joined are placed into the shaft, end-to-end, and the two heads are then advanced toward one another, for contact preferably near the middle of the shaft. As can be appreciated from the figure, the two camming surfaces on the confronting heads are designed to act against one another as the heads are tightened against the other. As this occurs, the segments in both heads are caused to pivot toward the center axis of the shaft, to clamp each associated workpiece to the shaft. Thus, each head serves both as a fastener, in combination with shaft 152, for securing a workpiece to the shaft, and as a tightening member, for providing a contact surface against which the camming surface in the opposite head is forced.

The two-sided clamp shown at FIG. 11 may be modified for quick-lock action in which each head rides on a wide thread or groove for locking action over a short head rotation, such as a quarter turn rotation. The means for holding the heads against one another may here include a ball and socket configuration formed in the confronting interior surfaces of the heads, such that head rotation to a locking position brings a ball (rounded protuberance) from one head into a socket in the other head. The heads would here preferably be formed of a flexible polymer material, such as polyethylene or teflon.

Figure 12:
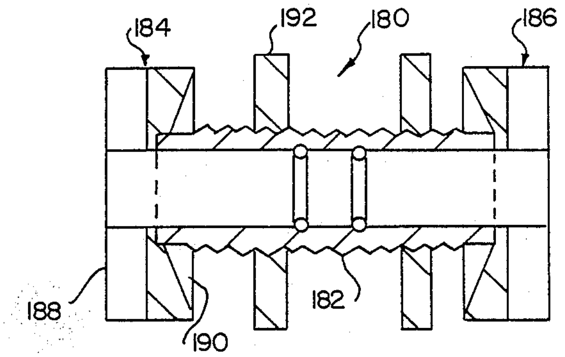
FIG. 12 shows a two-sided clamp constructed according to another embodiment of the invention.

FIG. 12 shows another embodiment of a two-sided fastener device 180 for use in connecting a pair of workpieces, such as tubes, end-to-end. The device includes a threaded, hollow shaft 182 which is joined at its opposite ends to heads 184, 186, which each have the general construction described with respect to FIG. 1. Each head, such as head 184, thus forms with the shaft, a fastener having an outwardly facing exterior surface, such as surface 188, and an inwardly facing interior surface, such as surface 190, which provides an outer camming surface.

The device further includes a pair of nuts, such as nut 192, which each serve as a tightening member in the corresponding side of the device. The operation of the device follows the general principles described above, where a pair of workpieces are first inserted into the shaft, then each nut is tightened against the corresponding camming surface, to clamp the associated workpiece to the shaft.

From the foregoing, it can be appreciated how various objects and features of the invention have been met. The device can be constructed for applying large clamping forces on a workpiece, produced by pivoting of the jaws of a segmented head against the workpiece. Unlike conventional slotted shafts which are squeezed into a clamping condition, and which tend to undergo irreversible deformation on clamping, the segmented heads in the present invention tend to return to an open-jaw condition after clamp release, allowing repeated clamping and unclamping operations.

The device can be constructed in a variety of configurations suitable for different workpiece mounting. For example, the workpiece can be supported in only the head portion of the device, or can extend completely through the shaft as well. The tightening mechanism can be designed so that the workpiece rotates during tightening (by rotating the fastener), or so that the workpiece is held stationary during tightening (by rotating the tightening member). Alternatively, in the embodiments shown in FIGS. 6 and 8, clamping is effected without any rotation, simply by advancing the fastener axially against the tightening member. In another embodiment, a workpiece can be mounted on a support by screwing the fastener into the support.

The novel clamping mechanism of the invention also allows construction of a two-sided clamp having a simplified construction in which the fastener on one side of the clamp serves as the tightening member on the other side.

While the invention has been described with reference to specific embodiments, it will be realized that various modifications and changes can be made within the scope of the invention.

It is claimed:

1. A device for clamping a pair of workpiece together comprising a threaded, hollow shaft adapted to receive end portions of the two workpiece therein, and a pair of fastener heads, each composed of an exterior portion having an exterior surface and defining slots extending axially from said exterior surface, said slots forming segments in said head, and a threaded interior portion threadedly engaged with said shaft and terminating at an interior surface, said head defining an axial passageway which forms an axial extension of the hollow region of the shaft, the interior surfaces of said heads having mutually confronting camming surfaces which are designed to act upon one another, as the heads are moved on the shaft toward a position of contact between the two camming surfaces, to force the segments in each head radially inwardly, thereby reducing the cross section of the associated passageway, adjacent the exterior surface of the each head, and causing clamping of a workpiece received in the passageway defined by each head.

2. A fastener for supporting a workpiece in a clamped condition on a wall support able to receive a screw therein, comprising (a) a head having exterior and interior surfaces, and (b) a threaded screw attached to the head and extending substantially normally from the interior surface thereof, along a longitudinally extending central axis, said head defining a passageway extending inwardly along said axis from said exterior surface toward, but not through said screw, and dimensioned for receiving a portion of such workpiece therein, said head further defining slots extending axially from said exterior surface, said slots forming segments in said head, said interior surface having a camming surface adapted to engage such wall surface, as the fastener is rotated to engage the screw with the wall support, to force said segments toward said axis, thereby reducing the cross section of said passageway adjacent said exterior surface and cause clamping of a workpiece received in said passageway.

3. The fastener of claim 2, wherein the screw is detachably removable from said head.

4. A fastener for clamping a workpiece on a wall support having an opening formed therein, said fastener comprising (a) a head having exterior and interior surfaces, and (b) a shaft attached to the head and extending substantially normally from the interior surface thereof, along a longitudinally extending central axis, said shaft being dimensioned to be received in such wall support opening, and having surface serrations which are adapted to engage the walls of the opening, to secure the shaft to the wall support, when the shaft in forced axially into the opening, said head defining a passageway extending inwardly along said axis from said exterior surface, for receiving a portion of such workpiece therein, said head further defining slots extending axially from said exterior surface, said slots forming segments in said head, said interior surface having a camming surface adapted to engage such wall surface, as the fastener is forced axially into the opening in the wall support, to force said segments toward said axis, thereby reducing the cross section of said passageway adjacent said exterior surface and cause clamping of a workpiece received in said passageway.

* * * * *